March 4, 1924.
W. MERTÉ
1,485,515
TELEPHOTO OBJECTIVE
Filed Aug. 13, 1921
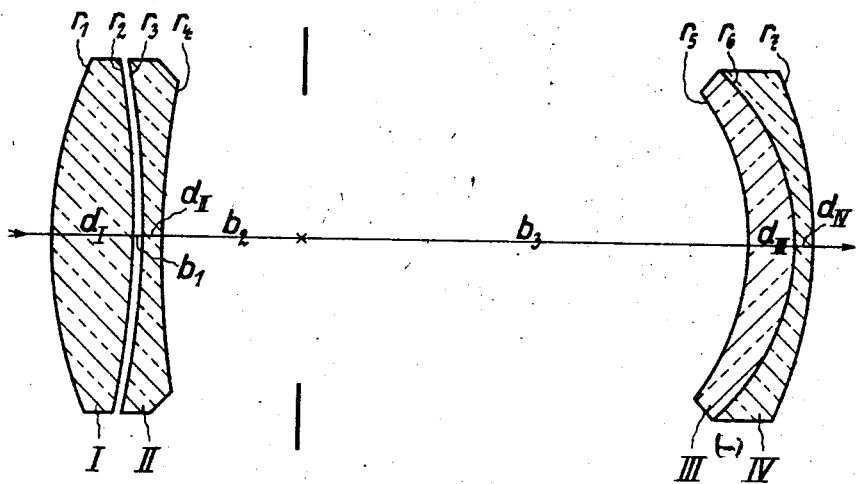
Inventor:
Willy Merté

Patented Mar. 4, 1924.

1,485,515

UNITED STATES PATENT OFFICE.

WILLY MERTÉ, OF JENA, GERMANY, ASSIGNOR TO THE FIRM OF CARL ZEISS, OF JENA, GERMANY.

TELEPHOTO OBJECTIVE.

Application filed August 13, 1921. Serial No. 492,122.

(GRANTED UNDER THE PROVISIONS OF THE ACT OF MARCH 3, 1921, 41 STAT. L., 1313.)

*To all whom it may concern:*

Be it known that I, WILLY MERTÉ, a citizen of the German Empire, residing at Jena, Germany, have invented a new and useful Telephoto Objective (for which I have filed an application in Germany June 16, 1919; Switzerland, June 21, 1920, Patent 88,402; Austria, June 22, 1920; England, June 29, 1920, Patent 145,548; France, July 2, 1920, Patent 518,732, and Italy, July 8, 1920), of which the following is a specification.

The present invention relates to an objective which consists of a front member having collective power and a back member having a dispersive effect, and the hinder principal point of which lies in front of the foremost lens surface, in which manner, therefore, (as is the rule in so-called telephoto objectives) the distance from the said lens surface to the focal plane of the objective is smaller than the focal length of the objective. The invention deals with that well-known kind of the said type of objectives in which the front member consists of two lenses which are separated from each other by a dispersive air lens, and the back member of two lenses cemented together, the two components of each of the two members being of opposite sign.

The invention affords the possibility of constructing, within the said type of objectives, such as are endowed with comparatively great light-gathering power and yield a comparatively large field of view, the spherical, the chromatical, and especially the astigmatical aberrations being, in addition, corrected to such an extent as hitherto in general not obtainable in telephoto objectives, if the cemented surface contained in the back member be made collective.

The annexed drawing shows an example of the objective according to the present invention in axial section.

In the following table are enumerated the dimensions with respect to the constructional example as represented in the drawing which apply to the focal length 100, and the numeral values characterizing the different kinds of glass made use of.

$r_1 = +18,091$    $d_I = 3,329$
$r_2 = -38,834$    $b_1 = 0,130$
$r_3 = -36,679$    $d_{II} = 0,83$
$r_4 = +38,740$    $b_2 = 5,66$
$r_5 = -10,396$    $b_3 = 18,25$
$r_6 = -9,426$    $d_{III} = 1,89$
$r_7 = -17,130$    $d_{IV} = 0,75$

|  | I | II | III | IV |
|---|---|---|---|---|
| $n_D =$ | 1,59234 | 1,59704 | 1,62410 | 1,49900 |
| $n_{G'} =$ | 1,60464 | 1,61718 | 1,64732 | 1,50840 |

A telephoto objective corresponding to the example given may suitably be employed up to an aperture ratio of 1:6,3, which is comparatively large for a telephoto objective.

I claim:

In a spherically, chromatically and astigmatically corrected objective, a collective front member, a dispersive back member, the hinder principal point of the said objective lying in front of the foremost lens surface, the said front member consisting of two lenses separated from each other by a dispersive air-lens, the said back member consisting of two lenses cemented together, the two components of each of the said two members being of opposite sign, and the cemented surface having collective power.

WILLY MERTÉ.

Witnesses:
 PAUL KRÜGER,
 RICKARD HAHN.